Figure 2:
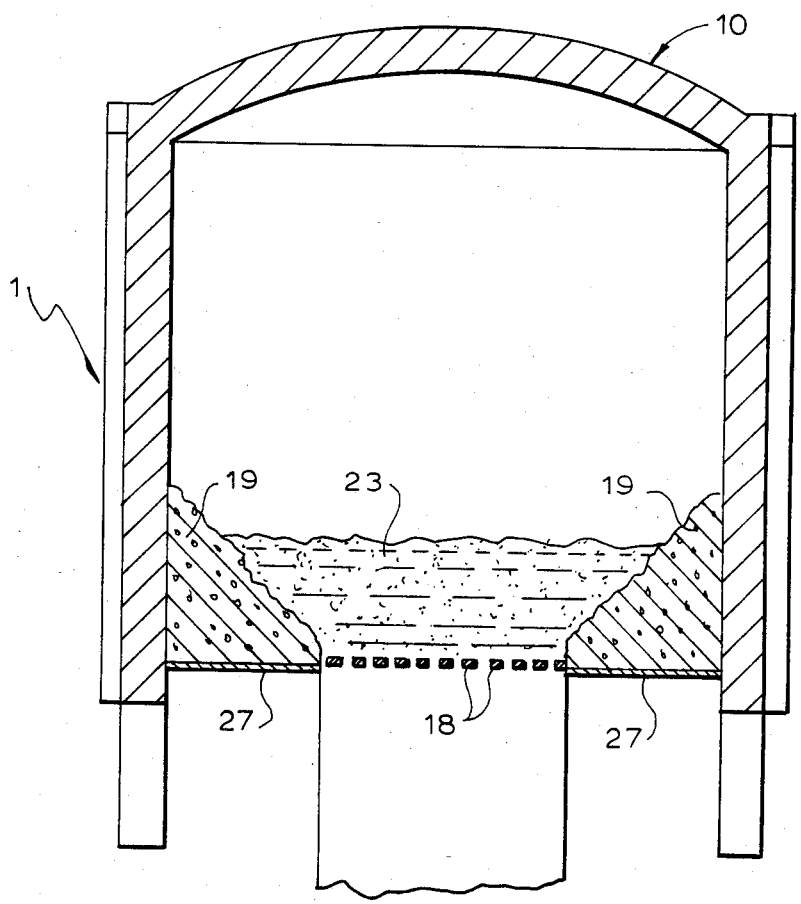

United States Patent [19]

Henin et al.

[11] Patent Number: 4,601,657
[45] Date of Patent: Jul. 22, 1986

[54] PROCESS FOR THE CALCINATION OF A PULVERIZED MINERAL MATERIAL

[75] Inventors: Jean-Pierre Henin, La Madeleine; Philippe Niel, Lille, both of France

[73] Assignee: Fives-Cail Babcock, Paris, France

[21] Appl. No.: 665,625

[22] Filed: Oct. 29, 1984

[30] Foreign Application Priority Data

Oct. 28, 1983 [FR] France .............................. 83 17270

[51] Int. Cl.⁴ .............................................. F27B 7/02
[52] U.S. Cl. ..................................... 432/14; 432/106; 110/347; 110/245; 110/229
[58] Field of Search ...................... 110/347, 229, 245; 432/106, 58, 14

[56] References Cited

U.S. PATENT DOCUMENTS

| | | | |
|---|---|---|---|
| 4,236,886 | 12/1980 | Ansen et al. | 110/347 |
| 4,250,820 | 2/1981 | Lautenschlager | 110/347 |
| 4,280,418 | 7/1981 | Erhard | 110/347 |
| 4,336,769 | 6/1982 | Daman | 110/229 |
| 4,344,371 | 8/1982 | Zoschak | 110/229 |
| 4,419,940 | 12/1983 | Cosar et al. | 110/229 |
| 4,430,094 | 2/1984 | Gorzegno | 110/229 |
| 4,465,460 | 8/1984 | Cosar | 110/347 |
| 4,477,251 | 10/1984 | Cosar et al. | 110/245 |

Primary Examiner—Henry C. Yuen
Attorney, Agent, or Firm—Kurt Kelman

[57] ABSTRACT

Pulverized mineral material is calcined by suspending it in a current of gas constituted by a combustive gas and a fuel whose combustion furnishes the necessary calories for the calcination. To enable solid fuels rich in ash, substantially inert and difficult to condition to be used, the fuel is gasified in a fluidized bed hearth by blowing air from below through the bed whereby a gaseous fuel is disengaged from the bed and flows upwardly with the very finest particles of the solid fuel suspended therein. This is mixed with air and the mineral material to calcine the same.

6 Claims, 3 Drawing Figures

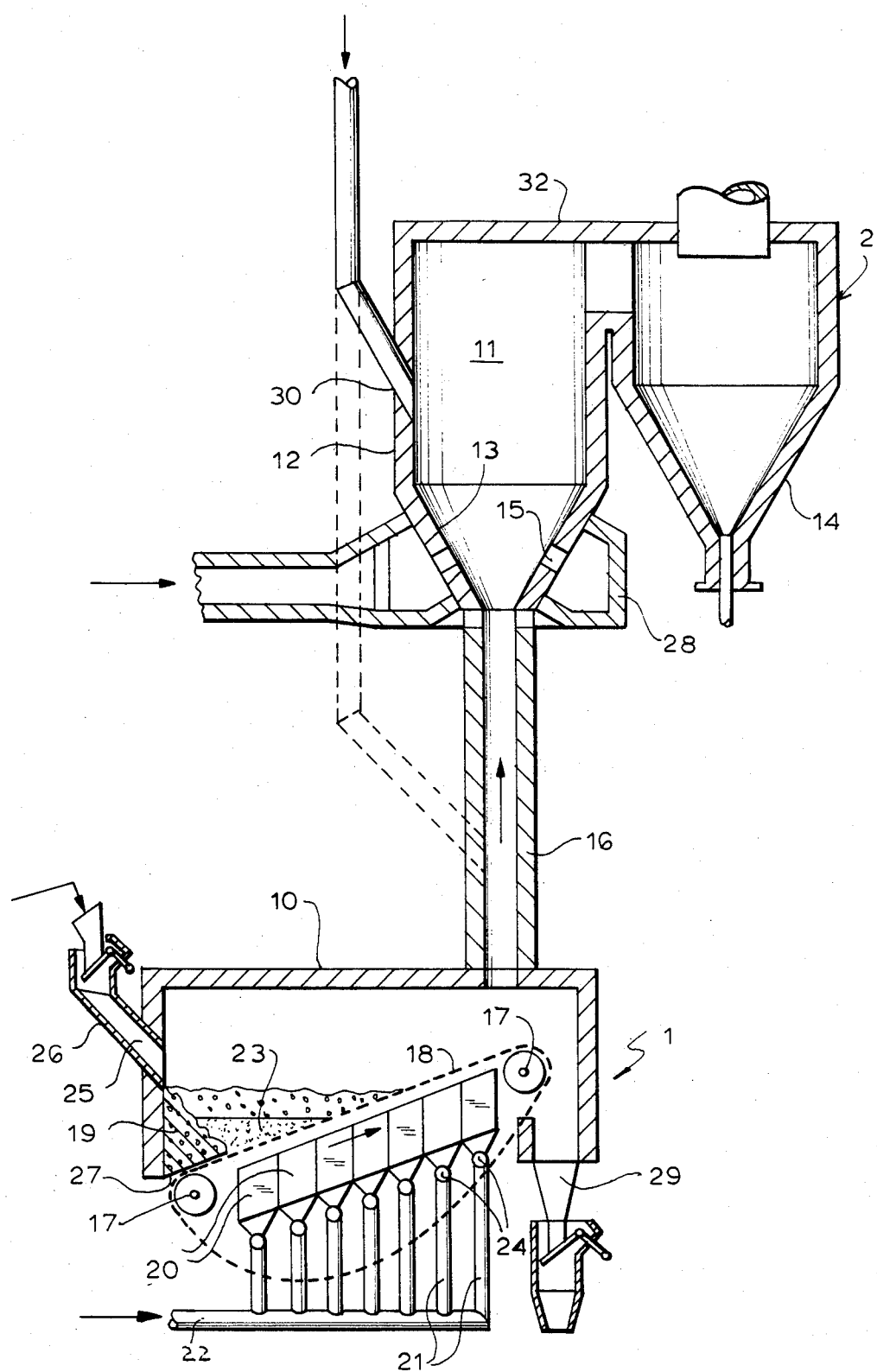
F I G. 1

PROCESS FOR THE CALCINATION OF A PULVERIZED MINERAL MATERIAL

The present invention relates to the calcination of a pulverized mineral material by suspending the material in a gaseous current constituted by a mixture of a combustive gas and a fuel whose combustion by the gas furnishes the required calories for the calcining reaction.

In the first industrial installations of this type, oil or natural gas was used as fuel. However, because of the high price of these fuels, they were replaced by less costly combustible materials. However, in conventional suspension calcination processes, wherein the fuel is injected into the calcination chamber directly with the material to be calcined, the choice of fuels is limited by certain quality criteria dependent on their ability to burn and their composition (ash and sulfur content, etc.). For this reason, many fuels whose price is very competitive have up to now not been considered for use in such calcination installations, such as fuels high in sulfur content, for example certain types of coal and coke derived from oil, fuels very rich in ash, for example oil shale or bitumens, some substantially inert fuels, fuels which are difficult to condition, for example industrial, urban and domestic waste and laundry sludge, fuels producing relatively few calories on burning, and the like.

It is the primary object of this invention to permit the use of such fuels, alone or in admixture, for the calcination of pulverized mineral materials.

The calcination apparatus is capable of burning several fuels of this type.

Generally, the problem consists of assuring the proper combustion of these fuels and to prevent certain noxious components or products of the combustion from mixing with the calcined material.

The above and other objects are accomplished according to the present invention with a process which comprises the steps of gasifyng pieces of a solid fuel in a fluidized bed hearth by blowing air from below through the fluidized bed hearth until the solid fuel has been gasified and is disengaged from the fluidized bed hearth in an upwardly moving flow of gaseous fuel entraining the very finest solid fuel particles in suspension therein, and mixing air and the pulverized mineral material with said flow of gaseous fuel to burn the gaseous fuel and the solid fuel particles suspended therein until the burned fuel furnishes the required calories for the calcination. The pieces of solid fuel may have a size up to about 20 mm.

Figure 3:
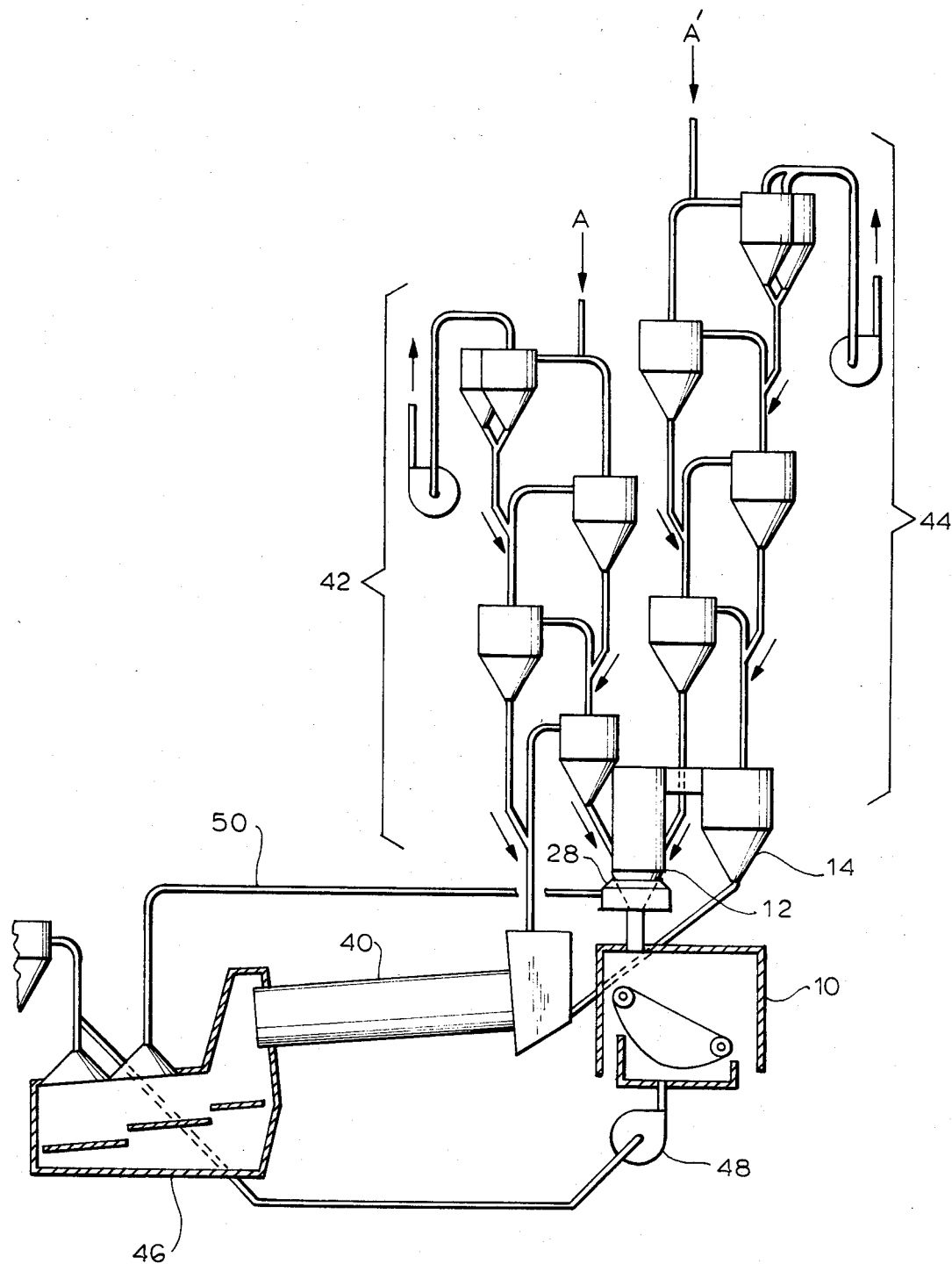

The above and other objects, advantages and features of the invention will become more apparent from the following detailed description of certain now preferred embodiments thereof, taken in conjunction with the generally schematic drawing wherein FIG. 1 shows a vertical section of a calcination apparatus for carrying out the process according to the present invention;

FIG. 2 is an enlarged transverse section taken perpendicularly to the section of FIG. 1, showing the fuel gasification device of the apparatus of FIG. 1; and FIG. 3 is a diagrammatic view of an installation for producing clinker from cement and incorporating the calcination apparatus.

Referring now to the drawing and first to FIGS. 1 and 2, there is shown an apparatus for the calcination of a pulverized mineral material, which comprises the combination of fuel gasification device 1, calcination device 2 and vertical connecting conduit 16 between hearth chamber 10 of the fuel gasification device and calcination chamber 12 of the calcination device connected to a lower end thereof.

The fuel gasification device includes hearth chamber 10 defined by an enclosing wall and grate 18 which constitutes the bottom or hearth of the chamber. The fuel gasification device also includes means 26 comprising duct or chute 25 passing through the enclosing wall of the hearth chamber for delivering pieces of a solid fuel to grate 18 to form a solid fuel bed thereon, and means for blowing air into hearth chamber 10 through grate 18 whereby fluidized bed 23 of solid fuel pieces is formed on the grate. The illustrated air blowing means comprises air conducting main 22 with a plurality of branch conduits 21 connected to respective windboxes 20 below and along the length of elongated grate 18, control valves 24 being mounted between the branch conduits and the windboxes to permit the flow of air per surface unit of the grate to be varied from one end of grate 18 to the opposite end thereof. It is also possible to vary the air flow through the grate along its length by changing the permeability thereof therealong.

The illustrated grate is elongated and comprises at least an end portion inclined in the direction of elongation of the grate and permitting fluidized bed 23 to be formed at a progressively variable depth, chute 25 being arranged to deliver the solid fuel at the deepest part of the bed, as shown in FIG. 1. The grate is constituted by the upper course of an endless chain constituted by hinged plates sufficiently spaced from each other to form a grate through which air may be blown upwardly from windboxes 20. The endless chain is supported by a pair of rolls 17, 17 at least one of which is driven to permit entrainment of the chain in a clockwise direction. In the illustrated embodiment, one of the rolls is arranged higher than the other so that the entire length of the upper course is inclined and the ascending upper chain course moves in the upward direction from the deepest part of fluidized bed 23. Screen 27 is placed above the lower end of the upper chain course to receive the pieces of solid fuel from chute 25 and the solid fuel pieces are heaped on the screen to form a non-fluidized bank of the fuel thereon adjacent to the deepest part of the fluidized bed. Furthermore, as shown in FIG. 2, flat supports 21 at each side of, and coplanar with, elongated grate 18 support banks 19 of non-fluidized solid fuel pieces heaped on the flat supports whereby fluidized bed 23 on grate 18 is retained between banks 19 to impart to fluidized bed 23 a trapezoidal, upwardly widening transverse cross section. The clockwise moving endless chain constituting grate 18 removes residual ashes from the grate at an upper end thereof remote from the deepest bed part into outlet means 29 connected to the hearth chamber and receiving the ashes by gravity therefrom to remove the ashes. Solid fuel delivery means 26 and the ash removal means are generally conventional.

Normally, the solid fuel is delivered in pieces having a particle size up to 10 or 20 mm and obtained by milling in the case of mineral fuels and by shredding in the case of fuels consisting of urban or vegetable waste. These pieces of solid fuel are placed on grate 18 and form a fluidized bed hearth by the air blown from windboxes 20 below the grate through fluidized bed 23, the air blast being sufficient to assure fluidization of the solid fuel in a highly agitated bed and to gasify the solid fuel, producing partial combustion and an upwardly moving flow of gaseous fuel disengaged from the fluidized bed hearth and entraining the very finest fuel particles in suspension therein. The minimum amount of air blown through the fluidized bed hearth must constitute about 30% to 60% of the stoichiometric air required for the complete combustion of the fuel to provide good agitation and corresponding fluidization of the bed of solid fuel and a proper stability of the partial fuel combustion. In this manner, the solid fuel is partially burned and partially gasified.

Due to the upwardly widening, trapezoidal transverse cross section of fluidized solid fuel bed 23, the air may be blown through the bed at high speeds, for example in excess of 10 meters/second, while the speed of the rising flow of the gaseous fuel and suspended fuel particles is kept relatively low in hearth chamber 10 to reduce the amount of flying particles above the bed.

A combustible gas whose temperature may vary between 900° C. and 1100° C. and which is charged with the finest particles of the solid fuel is discharged from the fluidized bed. Depending on the nature of the fuel, its granulometry and the shape of the hearth chamber, the fuel particles entrained with the gaseous fuel out of the fluidized bed hearth constitute about 20% to 50% of the fuel mass.

A large part, i.e. about 50% to 80%, of the residual ashes formed in fluidized bed 23 are removed by the upwardly moving grate. If the solid fuel has an average or high caloric power, the temperature in the fluidized bed hearth will attain between about 1000° C. and 1200° C., which is sufficient to cause the residual ashes to agglomerate. The resultant agglomerates settle in the bed on grate 18 which moves them out of the fluidized bed and discharges them at the upper end of the moving grate into hopper 29. However, if the solid fuel has low caloric power, the fluidized bed temperature will be too low to permit agglomeration of the ashes at the bottom of the bed. In this case and as shown in FIG. 1, fluidized bed 23 has a depth decreasing progressively from a first zone whereto the solid fuel is delivered from chute 25 to a second zone wherefrom the ashes are removed. Valves 24 are so adjusted that the air blown through the fluidized bed decreases in speed from the first to the second zone. In this case, the residual ashes will be deposited on the upper part of moving grate 18 and thus removed from the bed in a like manner by reducing the air flow per surface unit of grate and the corresponding velocity with which the air is blown therethrough progressively away from the zone where the solid fuel pieces are delivered to the grate, i.e. proportionally to the decreasing depth of the fluidized bed. Therefore, a fuel high in ash content may always be used without unfavorably influencing the quality of the calcined material.

If the solid fuel delivered to the hearth chamber is rich in sulfur as well as in ash, a fraction of the sulfur is affixed to the ash and removed therewith. However, to enhance the purification of the fuel, particles of a desulfurizing agent may be injected into the fluidized bed, the desulfurizing agent particles having dimensions between about 0.5 and 5 mm. The desulfurizing agent, such as limestone, chalk, dolomite and the like, may be delivered with the solid fuel and will bond part of the sulfur thereto. The particle size of the desulfurizing agent will be so selected that it will be effectively fluidized in the active portion of the bed and will not be entrained with the flow of gaseous fuel but will be removed with the ashes.

While the grate has been illustrated as an endless chain, functionally equivalent grates with moving bars may be used to assure the ascendant displacement of slag or ashes from the fluidized bed. Also, the grate need not be upwardly inclined throughout its length, as shown, but may have a horizontal portion at an end zone serving to receive the solid fuel pieces and an upwardly inclined portion at an opposite end zone serving to discharge residual ashes or slag.

The flow of gaseous fuel and the solid fuel particles suspended therein are upwardly guided through substantially vertical conduit 16 at a speed of ascension in excess of 20 meters/second to separate calcination chamber 12. The cross section of the conduit is selected to permit such a minimum flow velocity to prevent the largest particles suspended in the gaseous fuel from falling back into the hearth chamber by gravity. The separation of the calcination chamber from the hearth chamber in which the fuel is gasified permits the geometry and shape of the hearth chamber to be optimized with a view to minimizing free flying fuel particles and ashes in the flow of gaseous fuel delivered to the calcination chamber. The gaseous fuel and the solid fuel particles suspended therein are completely burned in the separate calcination chamber.

For this purpose, calcination device 2 includes calcination chamber 12 having a vertical axis coaxial with vertical conduit 16. The calcination chamber is constituted by cylindrical upper part 11 and a lower part having an inverted frusto-conical or funnel-shaped wall 13 defining openings 15 therein. Connecting conduit 16 between hearth chamber 10 of fuel gasification device 1 and calcination chamber 12 is connected to a lower end thereof. The calcining device further includes annular air distributing means 28 surrounding the lower calcination chamber part and communicating with the calcination chamber through openings 15, inlet means 30 for delivering the mineral material into the calcination chamber, and outlet means 32 for the calcined mineral material at an upper end of the calcination chamber. Inlet means 30 comprises a chute delivering the mineral material to calcination chamber 12 approximately midway between the ends thereof. Alternatively and as shown in broken lines in FIG. 1, the mineral material inlet means may be connected to connecting conduit 16 to deliver the material with the ascending flow of gaseous fuel into the calcination chamber. The calcined mineral material is delivered through outlet means 32 into a cyclone 14, to which the outlet means is directly connected and which will be further described hereinafter in connection with FIG. 3.

In this calcination chamber, the air distributed by annular distributor 28 through openings 15 and the flow of gaseous fuel are mixed with the pulverized mineral material delivered through inlet means 30 to burn the gaseous fuel and the very fine solid fuel particles suspended therein until the burned fuel furnishes the required calories for the calcination of the material.

The gaseous fuel current and the pulverized mineral material circulate through calcination chamber 12 from the lower to the upper part thereof, the mixture of the gaseous fuel, the air and the mineral material taking place in the lower calcination chamber part and the combustion products as well as the calcined mineral material being exhausted at the top of upper calcination chamber part 11 through outlet duct 32. The exhaust gases are separated from the calcined mineral material in cyclone 14. The flow velocity in cylindrical upper calcination chamber part 11 must be sufficient for the entrainment of the calcined mineral material particles but must be held within such limits that the very fine solid fuel particles suspended in the gaseous fuel, which have a size of the order of a few hundred microns, are permitted to dwell in the calcination chamber long enough to be completely burned. The complete combustion of the gaseous fuel and the fuel fines furnishes the calories required for the calcination of the pulverized mineral material.

FIG. 3 diagrammatically shows a generally conventional cement plant using the calcination system of the present invention. The illustrated installation includes tubular rotary kiln 40 and two series 42 and 44 of heat exchange cyclones. The exhaust gases from the kiln pass through the cyclones of series 42 while calcination system 10, 12 is connected to cyclone 14 of series 44 so that the exhaust gases from the calcination system pass through the cyclones of this series. The clinker discharged from the rotary kiln is air-cooled in cooler 46. A fraction of the mineral raw material is pre-heated in heat exchanger 42 by means of the kiln exhaust gases passing through its cyclones and the other mineral raw material fraction is pre-heated by means of the exhaust gases discharged from calcination chamber 12. The preheated material is discharged from the last cyclone of each heat exchanger 42 and 44 into calcination chamber 12 which has respective inlet ducts connecting it to these cyclones. All of this arrangement is generally conventional and will, therefore, not be further described herein.

A first fraction of the cooling air at a temperature of the order of 200° C. to 300° C. is exhausted from cooler 46 by fan 48 and moved thereby below grate 18 for use in fluidizing the bed of solid fuel pieces and partially burning the fuel in the fluidized bed. A second fraction of the cooling air at a temperature of the order of 800° C. to 850° C. is exhausted from the cooler through duct 50 connected to air distributor 28 and serves as combustion air for burning the gaseous fuel and the solid fuel particles suspended therein. The calcined mineral material moved from the calcination chamber into cyclone 14 is separated therein from the exhaust gases coming from the calcination chamber and the separated calcined mineral material is delivered to rotary kiln 40.

What is claimed is:

1. A process for the calcination of a pulverized mineral material, which comprises the steps of
  (a) gasifying pieces of a solid fuel in a fluidized bed hearth wherein the fluidized bed is maintained at a depth decreasing progressively from a first zone whereto the solid fuel is delivered to a second zone wherefrom residual ashes are removed by blowing air from below through the fluidized bed hearth and the air is blown through the fluidized bed at a speed decreasing from the first to the second zone until the solid fueld has been gasified and is disengaged from the fluidized bed hearth in an upwardly moving flow of gaseous fuel entraining the very finest solid fuel particles in suspension therein,
  (b) selecting the granulometry of the solid fuel particles so that the particles entrained with the gaseous fuel out of the fluidized bed hearth constitute about 20% to 50% of the fuel mass,
  (c) guiding the flow of gaseous fuel and the fuel particles suspended therein upwardly through a substantially vertical conduit at a speed of ascension in excess of 20 meters/second to a separate calcination chamber, and burning the gaseous fuel and the fuel particles in the separate calcination chamber, and
  (d) mixing air and the pulverized mineral material with said flow of gaseous fuel to burn the gaseous fuel and the solid fuel particles suspended therein until the burned fuel furnishes the required calories for the calcination.

2. The calcination process of claim 1, wherein the air blown through the fluidized bed hearth constitutes about 30% to 60% of the stoichiometric air required for the complete combustion of the fuel.

3. The calcination process of claim 1, wherein the temperature in the fluidized bed hearth is maintained between about 1000° C. and 1200° C., and residual ashes are removed from the fluidized bed hearth in the form of agglomerates deposited at the bottom of the bed.

4. The calcination process of claim 1, wherein the fluidized bed is laterally retained to form a trapezoidal, upwardly widening cross section.

5. The calcination process of claim 1, further comprising the step of injecting particles of a desulfurizing agent into the fluidized bed, the desulfurizing agent particles having dimensions between about 0.5 and 5 mm.

6. The calcination process of claim 1, further comprising the steps of air-cooling the mineral material, and using a first fraction of the cooling air at a temperature of the order of 200° C. to 300° C. for fluidizing the bed and partially burning the fuel in the fluidized bed, and a second fraction of the cooling air at a temperature of the order of 800° C. to 850° C. for burning the gaseous fuel and the fuel particles suspended therein.

* * * * *